3,660,441
REACTION OF AN ALDEHYDE WITH A
CARBOXYLIC ACID
Donald M. Fenton, Anaheim, Calif., assignor to Union
Oil Company of California, Los Angeles, Calif.
No Drawing. Filed Aug. 12, 1970, Ser. No. 63,313
Int. Cl. C08h 17/36
U.S. Cl. 260—413                                            8 Claims

ABSTRACT OF THE DISCLOSURE

The invention comprises reacting an aldehyde and a carboxylic acid in a liquid reaction medium containing a Group VIII noble metal, preferably in complex with a biphyllic ligand, to produce an aldehyde containing the hydrocarbon radical of the reactant acid and a carboxylic acid containing the hydrocarbon radical of the aldehyde. A typical process comprises reacting ethanal with stearic acid to produce octadecanal. The invention has particular utility in converting lower aldehydes to higher and more valuable aldehydes.

---

The invention relates to a method of forming a carboxylic acid from an aldehyde. More particularly, the invention relates to a method of forming a higher acid from a lower acid by reacting the lower acid with an aldehyde.

The methods of manufacturing aldehydes and carboxylic acids are known in the art. Aldehydes are commonly produced in a hydroformylation process wherein an olefin is reacted with carbon monoxide and hydrogen. Carboxylic acids are produced in a hydrocarboxylation reaction wherein an olefin is contacted with carbon monoxide and water or by oxidation of aldehydes. The hydrocarboxylation reaction is generally not as efficient as the aforementioned hydroformylation reaction, especially when higher acids are the desired product and oxidation processes are difficult to control and avoid side reactions. Hence a process wherein an aldehyde can be utilized to convert an acid to a more valuable acid contributes substantially to the art.

According to the invention, an aldehyde is reacted with a carboxylic acid in the presence of a Group VIII noble metal, preferably in complex association with a biphyllic ligand, to be defined hereinafter, at a temperature of 50° to 500° C. and at a pressure of 1–200 atmospheres, sufficient to maintain liquid phase reaction conditions. The reaction proceeds according to the following equation:

$$RCHO + R'COOH \rightarrow R'CHO + RCOOH$$

wherein R and R' are hydrocarbon groups as defined hereinafter.

As can be seen from the above mechanism, the hydrocarbon radicals of the aldehyde and carboxylic acids are interchanged so that the hydrocarbon radical of the acid becomes the hydrocarbon radical of the aldehyde and the hydrocarbon radical of the reactant aldehyde becomes the hydrocarbon radical of the product acid.

The reactant aldehyde of the invention has 2 to 24 carbons, preferably 2 to 14 carbons and has the structure:

$$RCHO$$

wherein R is a saturated or monocyclic aromatic hydrocarbon group such as alkyl, cycloalkyl or aryl. Preferably R is alkyl, and most preferably, alkyl having 1 to 10 carbons.

As used hereinabove, alkyl, cycloalkyl and aryl groups are those hydrocarbon groups wherein the aforementioned carbon atoms of the aldehyde group is bonded, respectively, to an alkyl, cycloalkyl or aryl carbon thus including such groups as aralkyl, alkylcycloalkyl, alkaryl, etc., as well as purely alkyl, cycloalky and aryl groups. Examples of suitable R groups are, therefore, methyl, ethyl, propyl, 2-ethylhexyl, octyl, isooctyl, decyl, octadecyl, 3-phenylbutyl, cyclobutyl, methylcyclopentyl, cyclohexyl, cyclooctyl, diethylcyclohexyl, phenyl, benzyl tolyl, xylyl, duryl, p-amylphenyl, 3,5-dihexylphenyl, etc.

Examples of suitable aldehydes are methanal, ethanal, propanal, butanal, pentanal, octanal, decanal, tetradecanal, eicosanal, tricosanal, 2-pentyltridecanal, 2-cyclohexylpentanal, 2-cyclopentylmethanal, cyclooctanal, cycyononanal, 2-phenyldodecanal, 3-phenyloctanal, 4-tolyl-5-cyclopentyldecenal, 3-cyclobutyl-4-phenyloctanal, etc.

The reactant carboxylic acid of the invention has 2 to 24 carbons, preferably 2 to 14 carbons and has the structure:

$$RCOOH$$

wherein R is a saturated or monocyclic aromatic hydrocarbon group such as alkyl, cycloalkyl or aryl. Preferably R is alkyl, and, most preferably, alkyl having 1 to 10 carbons.

As used hereinabove, alkyl, cycloalkyl and aryl groups are those hydrocarbon groups wherein the aforementioned carbon of the acid is bonded, respectively, to an alkyl, cycloalkyl or aryl carbon thus including such groups as aralkyl, alkylcycloalkyl, alkaryl, etc., as well as purely alkyl, cycloalkyl and ary groups. Exampes of suitabe R groups are, therefore, methyl, ethyl, propyl, 2-ethylhexyl, octyl, isooctyl, decyl, octadecyl, 3-phenylbutyl, cyclobutyl, methylcyclopentyl, cyclohexyl, cyclooctyl, diethylcyclohexyl, phenyl, benzyl, tolyl, xylyl, duryl, p-amylphenyl, 3,5-dihexylphenyl, etc.

Examples of suitable carboxylic acids are acetic acid, propionic acid, butyric acid, valeric acid, hexanoic acid, heptanoic acid, octanoic acid, decanoic acid, lauric acid, myristic acid, palmitic acid, stearic acid, tricocosanic acid, 2-cyclopentylacetic acid, 3-cycloheptylbutyric acid, 4-cyclooctyllauric acid, benzoic acid, toluic acid, 2-phenyloctanoic acid, 3-phenyllauric acid, 2-tolylmyristic acid, etc.

The catalyst of the invention comprises a Group VIII noble metal, which is preferably in complex association with a biphyllic ligand. The Group VIII noble metal may be ruthenium, rhodium, palladium, osmium, iridium, or platinum, preferably rhodium, palladium or iridium, and most preferably, palladium because of its greater activity. Combinations of the metals may be utilized, e.g., palladium with iridium, etc. A catalytic quantity of the metal is added, e.g., 0.000–5 weight percent of the reaction medium and the metal may be added as a soluble salt, complex or oxide such as halide (chloride, bromide, iodide, or fluoride), oxide, hydroxide, carbonyl, cyanide, hydride, nitrate, sulfate, carbonate, $C_1$–$C_5$ carboxylate, etc., or as an acid. The catalyst may also be added as a free metal. In the case wherein a biphyllic ligand is utilized, the particular source of the Group VIII noble metal is not critical since it readily complexes or can be readily made to complex with the biphyllic ligand when added in any form.

Examples of suitable sources of the noble metals are as follows: iridium carbonyl chloride, iridium carbonyl, iridium tetrabromide, iridium tribromide, iridum trifluoride, iridium trichloride, osmium trichloride, chloroosmic acid, palladium hydride, palladous chloride, palladous iodide, osmium isopropionate, iridium valerate, palladium acetate, palladous nitrate, platinic acid, platinous iodide, palladium cyanide, sodium hexachloroplatinate, postassium trichloro-(ethylene)platinate(II), chloropentaaminorhodium(III) chloride, rhodium dicarbonyl chloride dimer, rhodium nitrate, rhodium trichloride, rhodium carbonyl hydride, ruthenium trichloride, tetraaminoruthenium-hydroxychloro chloride, etc. Generally the halide salt and particularly the chloride salt are preferred sources of the Group VIII nobel metal (e.g., palladium chloride, rhodium chloride,, etc.). It is preferable that the metal be present in a higher valency state, e.g., plus 1 to 3 rather than a reduced valency state such as zero. Thus, the reduction of the metal prior to utilization in the process by, for example, treatment with hydrogen is generally unncessary and is not desirable.

The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands are well known in the art and can comprise organic compounds having at least about 3 carbons and containing arsenic, antimony, phosphorus or bismuth in a trivalent state. Of these the phosphorus compounds, i.e., the phosphines, are preferred; however, the arsines, stibines and bismuthines can also be employed. In general the preferred biphyllic ligands have the following structure:

$$E(R)_3$$

wherein E is trivalent phosphorus, arsenic, antimony or bismuth; and
wherein R is the same or different alkyl having 1 to about 10 carbons, cycloalkyl having 4 to about 10 carbons and/or aryl having 6 to about 10 carbons, examples of which are methyl, butyl, nonyl, cyclohexyl, cyclodecyl, phenyl, tolyl, xylyl, duryl, etc. Preferably at least one R is aryl, e.g., phenyl, tolyl, xylyl, etc., and, most preferably, the ligand is triaryl.

Examples of suitable biphyllic ligands having the aforementioned structure and useful in my invention to stabilize the catalysts composition are the following:

trimethylphosphine,
triethylarsine,
triethylbismuthine,
triisopropylstibine,
dioctylcycloheptylphosphine,
tricyclohexylphosphine,
ethyldiisopropylstibine,
tricyclohexylphosphine,
methyldiphenylphosphine,
methyldiphenylstibine,
triphenylphosphine,
triphenylbismuthine,
tri(o-tolyl)-phosphine,
ethyldiphenylphosphine,
phenylditolylphosphine,
phenyldiisopropylphosphine,
phenyldiamylphosphine,
exylyldiphenylarsine,
tolyldi(m-xylyl)stibine,
trixylylphosphine,
trixylylarsine,
trixylylstibine,
cyclopentyldixylylstibine,
dioctylphenylphosphine,
tridurylphosphine,
tricumenylphosphine, trixylylbismuthine, etc. Of the aforementioned, the aryl phosphines and particularly the triarylphosphines (eg., triphenylphosphine) are preferred because of their greater activity.

The Group VIII noble metal may be complexed with the above-described biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess (e.g., 10–300% of that stoichiometrically required to form a complex with the Group VIII metal). The complex has from 1 to about 5 moles of biphyllic ligand per atom of the metal and other components such as hydride, or soluble anions such as sulfate, nitrate, $C_1$–$C_5$ carboxylates (e.g., acetate, propionate, isobutyrate, valerate, etc.), halide (e.g., chloride, bromide, iodide, fluoride), etc., are preferably included in the complex catalyst of this invention. These components may be incorporated in the catalyst by the formation of the catalyst complex from a Group VIII noble metal salt of the indicated anions. A preferred complex is one comprising at least one halide ligand, e.g., chloride, iodide, or bromide, or at least one $C_1$–$C_5$ carboxylate, e.g., acetate, propionate, butyrate, etc., since these groups, particularly halide, have been shown to improve the activity of the catalyst.

The reaction is performed under liquid phase conditions and can be conducted in the presence of a suitable organic liquid, preferably a liquid which is a solvent for the reactants and catalyst and inert thereto under the reaction conditions. Suitable liquids include hydrocarbons, ketones, esters or ethers or a tertiary or heterocyclic amine. Suitable liquids are exemplified by hexane, heptane, octane, benzene, toluene, cyclohexane, cyclodecane, methyl, ethyl, ketone, diethyl ketone, ethyl n-butyl ketone, cyclohexanone, butyl ether, methyl tolyl ether, di-iso-amyl ether, methyl acetate, ethyl acetate, tributyl amine, triphenyl amine, pyridine, equinoline, etc.

The reaction can also be conducted in the absence of the above solvents by conducting the reaction in an excess of the reactant aldehyde and/or reactant acid, e.g., 2–100 times that stoichiometrically required for the reaction. This can be accomplished for example in a batch process, by terminating the reaction prior to most of the aldehyde and/or acid being consumed or, for example, in the continuous process by adding sufficient aldehyde and/or acid to maintain the desired level.

The reaction may be performed at moderate conditions,, e.g., temperatures of 50°–500° C., preferably 80°–350° C. and pressures of 1–200 atmospheres absolute, preferably 5–100 atmospheres, sufficient to maintain liquid phase conditions. The desired pressure may be maintained by adding an inert gas, e.g., nitrogen to the reaction mixture. Usually, the addition of an inert gas is not required.

The reaction can be performed batchwise or in a continuous fashion. When operating batchwise, the catalyst, the reaction medium, and the aldehyde and acid can be introduced into the reaction zone to form a liquid phase therein and the reaction zone can be heated to the desired reaction temperature. When an inert gas is required, it can be added at any time prior to the heating of the reaction medium. When performing the reaction in a continous fashion, the liquid components can be charged to the reaction zone to form a liquid phase therein and the aldehyde and acid continuously introduced into the reaction zone to contact the reaction medium containing the catalyst.

The liquid products can be withdrawn separately from the reaction zone by withdrawing a stream of the liquid reaction medium contained therein and the desired aldehyde and/or carboxylic acid recovered by conventional separation processing such as distillation. Any unreacted aldehyde and/or acid, as well as the catalyst and solvent, if utilized, may be recycled to the reaction medium.

EXAMPLE 1

The following example illustrates the invention and demonstrates the results actually obtained:

To a steel bomb were added 20 grams isobutyraldehyde, 100 milliliters acetic acid, ½ gram iridium trichloride tris (triphenylphosphine), 1 gram palladium chloride bis(triphenylphosphine) and 2 grams triphenylphosphine. The bomb was pressured with hydrogen to about 7 atmospheres and with carbon monoxide to about 21 atmospheres. The mixture was heated to an maintained at 100° C. for 2 hours and 200° C. for a second 2 hours. The liquid contents were removed and analyzed to reveal that 3 grams of isobutyric acid and 4 grams acetaldehyde were formed in the process.

EXAMPLE 2

The following examples illustrate other modes of practice presently contemplated:

To an autoclave are added 200 milliliters of ethanal, 300 milliliters of stearic acid, 5 grams palladium chloride and 15 grams of triphenylphosphine. The autoclave is pressured with 10 atmospheres of nitrogen and heated to and maintained at 150° C. for 4 hours. The liquid contents are removed to reveal that octadecanal and acetic acid is formed in the process.

To the autoclave are added 200 milliliters of propanol, 400 milliliters of benzoic acid, 5 grams iridium trichloride and 15 grams tritolylphosphine. The autoclave is pressured with 15 atmospheres of nitrogen and heated to and maintained at 300° C. for 6 hours. The liquid contents are removed and distilled to recover benzaldehyde and propionic acid.

To the autoclave are added 200 milliliters acetic acid, 400 milliliters benzaldehyde, 5 grams rhodium chloride and 15 grams tributylphosphine. The autoclave is pressured with nitrogen to 20 atmospheres and heated to and maintained at 250° C. for 10 hours. The liquid contents are removed and benzoic acid and acetaldehyde recovered by distillation.

To an autoclave are added 500 milliliters of 2-phenyl-4-cyclohexyldecanal, 200 milliliters of 4-phenyloctanoic acid, 10 grams palladium nitrate and 20 grams triphenylarsine. The autoclave is pressured with nitrogen to 15 atmospheres and heated to and maintained at 350° C. for 10 hours. The liquid contents are removed and 2-phenyl-4-cyclohexyldecanoic acid and 4-phenyloctanal recovered by distillation.

I claim:

1. A process comprising contacting an aldehyde having 2 to 24 carbons and having the structure:

RCHO wherein R is a saturated or monocyclic aromatic hydrocarbon group, and a carboxylic acid having 2 to 24 carbons and having the structure:

RCOOH wherein R is a saturated or monocyclic aromatic hydrocarbon group with a liquid reaction medium containing the minor amount of a Group VIII noble metal in complex association with a biphyllic ligand having the structure:

ER$_3$ wherein E is trivalent phosphorus, arsenic, antimony or bismuth; and wherein R is the same or different alkyl having 1 to 10 carbons, cycloalkyl having 4 to 10 carbons, or aryl having 6 to about 10 carbons, at a temperature of 50°–500° C. and a pressure of 1–200 atmospheres sufficient to maintain liquid reaction conditions to form an aldehyde having as its hydrocarbon group the hydrocarbon group of the reactant acid and to form a carboxylic acid having as its hydrocarbon group the hydrocarbon group of the reactant aldehyde.

2. The method of claim 1 wherein the R group of the reactant aldehyde and the R group of the reactant acid are alkyl.

3. The method of claim 1 wherein the R group of the aldehyde is alkyl and the R group of the acid is aryl, aralkyl or alkaryl.

4. The method of claim 1 wherein the Group VIII noble metal is palladium or iridium.

5. The method of claim 1 wherein the Group VIII noble metal is palladium.

6. The method of claim 1 wherein the biphyllic ligand is a triarylphosphine.

7. The method of claim 1 wherein the Group VIII noble metal is palladium, the biphyllic ligand is a triarylphosphine and the R groups of the aldehyde and the carboxylic acids are alkyl.

8. The method of claim 7 wherein said alkyl groups have 1 to 10 carbons.

References Cited
FOREIGN PATENTS
450,259   8/1948   Canada _____ 260—413

LEWIS GOTTS, Primary Examiner

E. G. LOVE, Assistant Examiner

U.S. Cl. X.R.
260—514 R, 515 R, 540, 541